(12) United States Patent
Ishii

(10) Patent No.: US 8,573,780 B2
(45) Date of Patent: Nov. 5, 2013

(54) PROJECTION-TYPE DISPLAY APPARATUS AND GEOMETRIC DISTORTION CORRECTING METHOD FOR CORRECTING GEOMETRIC DISTORTION

(75) Inventor: Atsushi Ishii, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 379 days.

(21) Appl. No.: 12/967,221

(22) Filed: Dec. 14, 2010

(65) Prior Publication Data

US 2011/0157232 A1 Jun. 30, 2011

(30) Foreign Application Priority Data

Dec. 28, 2009 (JP) ................. 2009-296580

(51) Int. Cl.
*G03B 21/14* (2006.01)
*H04N 3/23* (2006.01)

(52) U.S. Cl.
USPC ............. 353/69; 353/70; 348/745; 348/746

(58) Field of Classification Search
USPC ............... 353/69–70; 348/745–746
See application file for complete search history.

(56) References Cited

U.S. PATENT DOCUMENTS

| 6,846,081 B2 * | 1/2005 | Mochizuki et al. | 353/70 |
| 7,401,929 B2 * | 7/2008 | Matsumoto et al. | 353/70 |
| 2006/0038962 A1 * | 2/2006 | Matsumoto et al. | 353/69 |

FOREIGN PATENT DOCUMENTS

| CN | 1489382 A | 4/2004 |
| EP | 1385335 A1 | 1/2004 |
| JP | 2005-123669 A | 5/2005 |
| JP | 2008-060765 A | 3/2008 |
| JP | 2008-103978 A | 5/2008 |

OTHER PUBLICATIONS

Chinese Office Action issued in Chinese counterpart application No. CN201010602040.5, issued Sep. 19, 2012. English translation provided.

JP OA issued Jun. 11, 2013 for corres. JP 2009-296580.

* cited by examiner

*Primary Examiner* — Georgia Y Epps
*Assistant Examiner* — Magda Cruz
(74) *Attorney, Agent, or Firm* — Rossi, Kimms & McDowell LLP

(57) ABSTRACT

A projection-type display apparatus includes a display unit having a first effective area that is the largest usable area for a display, and a geometric distortion corrector configured to correct a geometric distortion by performing, for an input image that is superimposed onto an image of a second effective area that is set in and smaller than the first effective area and is a virtual effective area whose geometric distortion has not yet been corrected, enlargement processing so that a third effective area that is a post-correction virtual effective area can have a portion located in an area between the first effective area and the second effective area and the second effective area can be enlarged.

2 Claims, 3 Drawing Sheets

PROJECTION-TYPE DISPLAY APPARATUS AND GEOMETRIC DISTORTION CORRECTING METHOD FOR CORRECTING GEOMETRIC DISTORTION

BACKGROUND OF THE INVENTION

1. Field of the Invention

The present invention relates to a projection-type display apparatus and a geometric distortion correcting method.

2. Description of the Related Art

Japanese Patent Laid-Open No. ("JP") 2005-123669 discloses a projection-type display apparatus configured to perform Keystone distortion correction, for an input image having an aspect ratio different from that of a display device (liquid crystal panel), by enlarging its horizontal or vertical length. This projection-type display apparatus can prevent dropping of the vertical or horizontal resolution and maintain the image quality.

However, in JP 2005-123669, the enlargement ratio is different according to input images, and thus even when a certain input image is adjusted so that its projected image can be displayed on a predefined area of a projection surface, the projected image of another input image overflows the predefined area. In this case, even when a position and an attitude of the projection-type display apparatus are fixed, it is necessary to readjust a zoom and a distortion correcting amount, lowering the operability.

SUMMARY OF THE INVENTION

The present invention provides a projection-type display apparatus and a geometric distortion correcting method, which can prevent the image degradation and improve the operability.

A projection-type display apparatus according to one aspect of the present invention includes a display unit having a first effective area that is the largest usable area for a display, and a geometric distortion corrector configured to correct a geometric distortion by performing, for an input image that is superimposed onto an image of a second effective area that is set in and smaller than the first effective area and is a virtual effective area whose geometric distortion has not yet been corrected, enlargement processing so that a third effective area that is a post-correction virtual effective area can have a portion located in an area between the first effective area and the second effective area and the second effective area can be enlarged.

Further features of the present invention will become apparent from the following description of exemplary embodiments with reference to the attached drawings.

DESCRIPTION OF THE EMBODIMENTS

Figure 1:
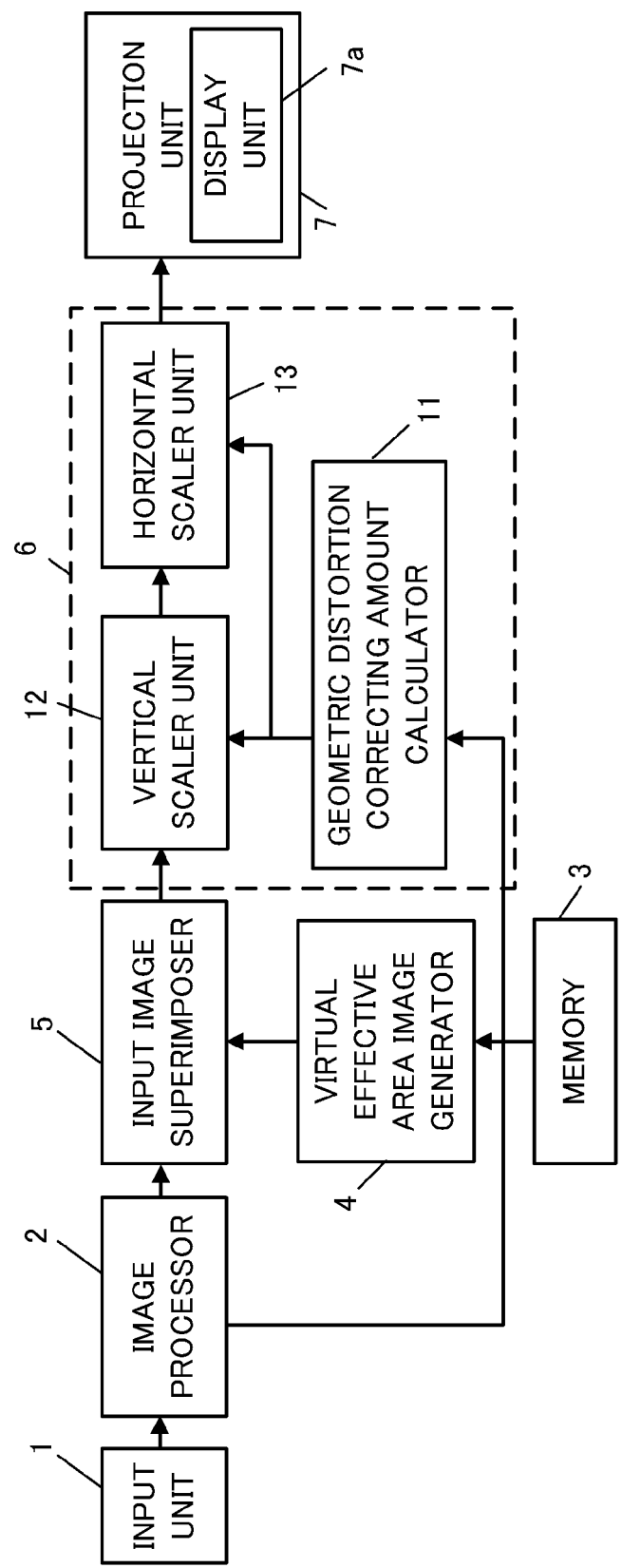
FIG. 1 is a block diagram of a projection-type display apparatus (projector) of this embodiment.

FIG. 1 is a block diagram of a projection-type display apparatus (projector) according to this embodiment. The projection-type display apparatus includes an input unit 1, an image processor 2, a memory 3, a virtual effective area image generator 4, an input image superimposer 5, a geometric distortion corrector 6, and a projection unit 7.

The input unit 1 performs processing, such as an analogue-to-digital conversion for an input image signal and converts it into image data. The input unit 1 also serves as a setting unit, such as a graphical user interface ("GUI"), configured to set the following virtual effective area. Moreover, the input unit 1 can also input information used for the geometric distortion correction, such as an inclination angle in the Keystone distortion. The virtual effective area and parameters for the geometric correction input from the input unit 1 are stored in the memory 3.

The image processor 2 performs processing, such as adjustments of the brightness and color, de-interlace, and resolution conversion, for the input data from the input unit 1 based on the user set parameters and preset parameters stored in the memory 3.

In the resolution conversion, the information relating to the virtual effective area stored in the memory 3 is referred to, and, for example, resolution conversion processing such that a reduced image can be accommodated in the virtual effective area while an aspect ratio of the input image is maintained, or resolution conversion processing such that the image can be enlarged up to its maximum size within the virtual effective area is performed. The "virtual effective area" is a virtually conceivable effective area having a set center and height that coincide with those of an effective area that is the largest usable area for the following display unit for displaying. This "virtual effective area" is actually used for display in view of the size and shape of the projection surface (screen).

The virtual effective area (VEA) image generator 4 finds a size of the VEA image based on information relating to the pre-correction VEA (second effective are) stored in the memory 3, and generates an image. The pre-correction VEA which corresponds to a pre-correction virtual effective area U (illustrated on the left side in FIG. 3) is set in the effective area of the display unit 7a through the input unit 1 at the correction time by the user based on the aspect ratio of the projection surface. The pre-correction VEA is a virtual effective area that is set inside of the effective area of the display unit 7a and is the largest area projectable onto the projection surface.

The input image superimposer 5 superimposes the image processed by the image processor 2 on the VEA image sent by the VEA image generator 4.

The geometric distortion corrector 6 performs a geometric distortion correction (Keystone correction) utilizing the enlargement processing for the input image superimposed by the input image superimposer 5, based on a correction parameter (such as an inclination angle of the Keystone distortion) relating to the geometric correction stored in the memory 3 and information relating to the effective area.

When a pre-correction rectangular image formed by the display unit 7a is displayed as a trapezoidal image on the projection surface, the geometric distortion corrector 6 corrects the geometric distortion of the pre-correction image formed by the display unit by turning the trapezoid upside down and into a trapezoidal image, and obtains a rectangular image on the projection surface. In this case, the geometric distortion corrector 6 corrects the geometric distortion such that the aspect ratio of the post-correction rectangular image projected on the projection surface can be equal to that of the pre-correction rectangular image formed by the display unit.

The geometric distortion is not limited to the Keystone distortion, and contains other distortions, such as optical distortion and distortion caused by a projection onto a curved wall or a corner of a wall (dent of 90°). Correction data for the optical distortion is obtained from the memory that stores the lens information, and correction data for a distortion caused by the projection surface is obtained by designating a shift position at the projection time through a tool or camera photography.

The projection unit 7 displays an image corrected by the geometric distortion corrector 6 through the display unit 7a, and projects it onto the projection surface. The display unit 7a includes a (first) effective area that is the largest usable area for a display. The display unit 7a is, but not limited to, a grating-shape display unit, such as a liquid crystal panel, and may be a display unit configured to display a projection image and to provide an optical modulation.

Figure 3:
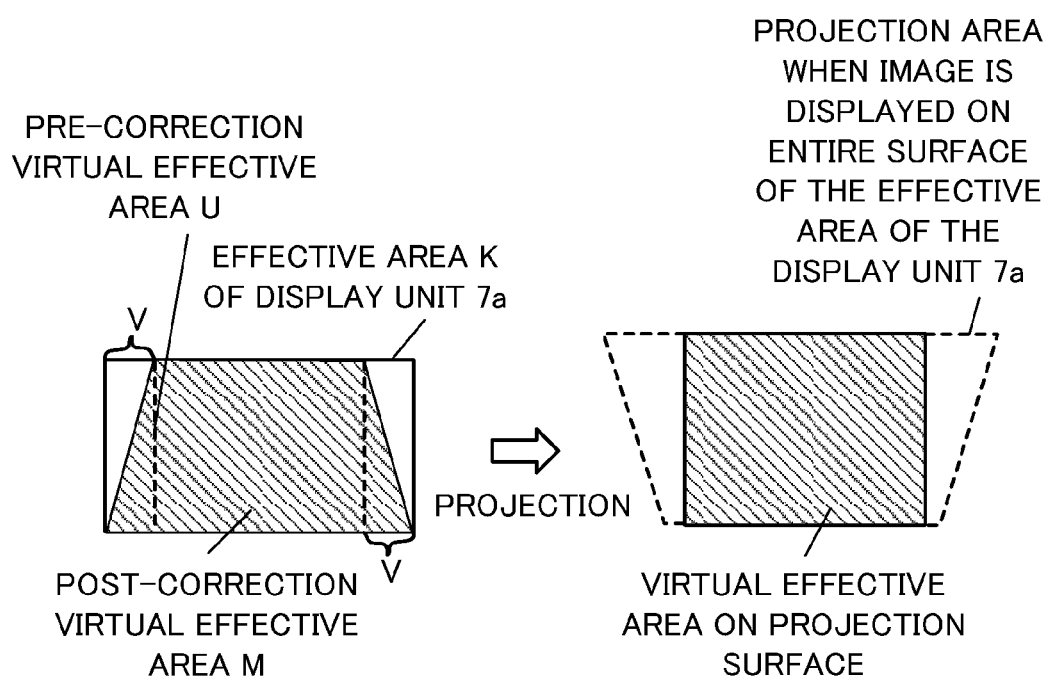
FIG. 3 is a view for explaining an effect of a geometric distortion correction in this embodiment.

The left side in FIG. 3 illustrates a pre-geometric-distortion-correction virtual effective area U (second effective area) that is set inside of the (first) effective area K of the display unit 7a having an aspect ratio of 16:9 illustrated by a solid line, is smaller than the effective area K, and has an aspect ratio of 4:3. In the left side of FIG. 3, the effective area K of the display unit 7a and the pre-correction virtual effective area U have the same center and the same vertical length (or height) but different horizontal widths. The horizontal boundaries of the virtual effective area U are illustrated by the dotted lines.

Conventionally, the aspect ratio of the effective area K of the display unit 7a is equal as 4:3 to that of the display area of the projection surface, and the pre-correction virtual effective area U is equal to the effective area K of the display unit 7a. The conventional geometric distortion corrector forms a post-correction VEA inside of the pre-correction VEA. In correcting the vertical Keystone distortion, vertical reduction processing is performed and the vertical resolution lowers. In correcting the horizontal Keystone distortion, horizontal reduction processing is performed and the horizontal resolution lowers. Thus, the image is degraded.

Recently, for a user having a wide screen, the effective area K of the display unit 7a may be configured to have an aspect ratio of 16:9 or 16:10. In this case, as illustrated in the left in FIG. 3, the effective area K of the display unit 7a exists outside of the pre-correction virtual effective area U.

Accordingly, this embodiment enlarges the post-correction VEA that is conventionally formed inside of the pre-correction virtual effective area U, up to an area V between the pre-correction virtual effective area U and the effective area K of the display unit 7a. In other words, the geometric distortion corrector 6 corrects the geometric distortion of the input image by performing the enlargement processing that enlarges the pre-correction virtual effective area U (second effective area). The enlargement processing is performed so that a post-correction virtual effective area M (third effective area) can have a portion located in the area V between the pre-correction effective area U and the effective area K of the display unit 7a. Thereby, the image degradation can be prevented.

This correction does not depend upon the resolution of the input image, and has a uniform geometric distortion correcting effect to any input images for a specific set virtual effective area. Therefore, once installation processing, such as zooming and shifting, is performed, a reset is unnecessary when an input image changes as long as the installation location or VEA is not varied.

The geometric distortion corrector 6 of this embodiment corrects a Keystone distortion caused when the projection-type display apparatus is inclined in the vertical direction relative to the projection surface, and includes a geometric distortion correcting amount calculator 11, a vertical scaler unit 12, and a horizontal scaler unit 13. The geometric distortion correcting amount calculator 11 includes, for example, a processor.

The vertical scaler unit 12 performs vertical enlargement/reduction processing to an image based on the set correcting amount, and the horizontal scaler unit 13 performs horizontal enlargement/reduction processing to the image with magnification different for each line based on the set correcting amount.

The geometric distortion correcting amount calculator 11 obtains from the memory 3 information relating to the effective area K of the display unit 7a and information relating to the pre-correction virtual effective area U, and the correction parameters, such as an inclination angle of the Keystone distortion, and calculates a correcting amount to be set to each of the vertical scaler unit 12 and the horizontal scaler unit 13.

In a range that can be corrected only by the enlargement processing of the horizontal scaler unit 13, the geometric distortion correcting amount calculator 11 uses only the horizontal scaler unit 13 for corrections. The geometric distortion correcting amount calculator 11 uses the vertical scaler unit 12 only when the horizontal enlargement cannot provide a sufficient correction.

Figure 2:
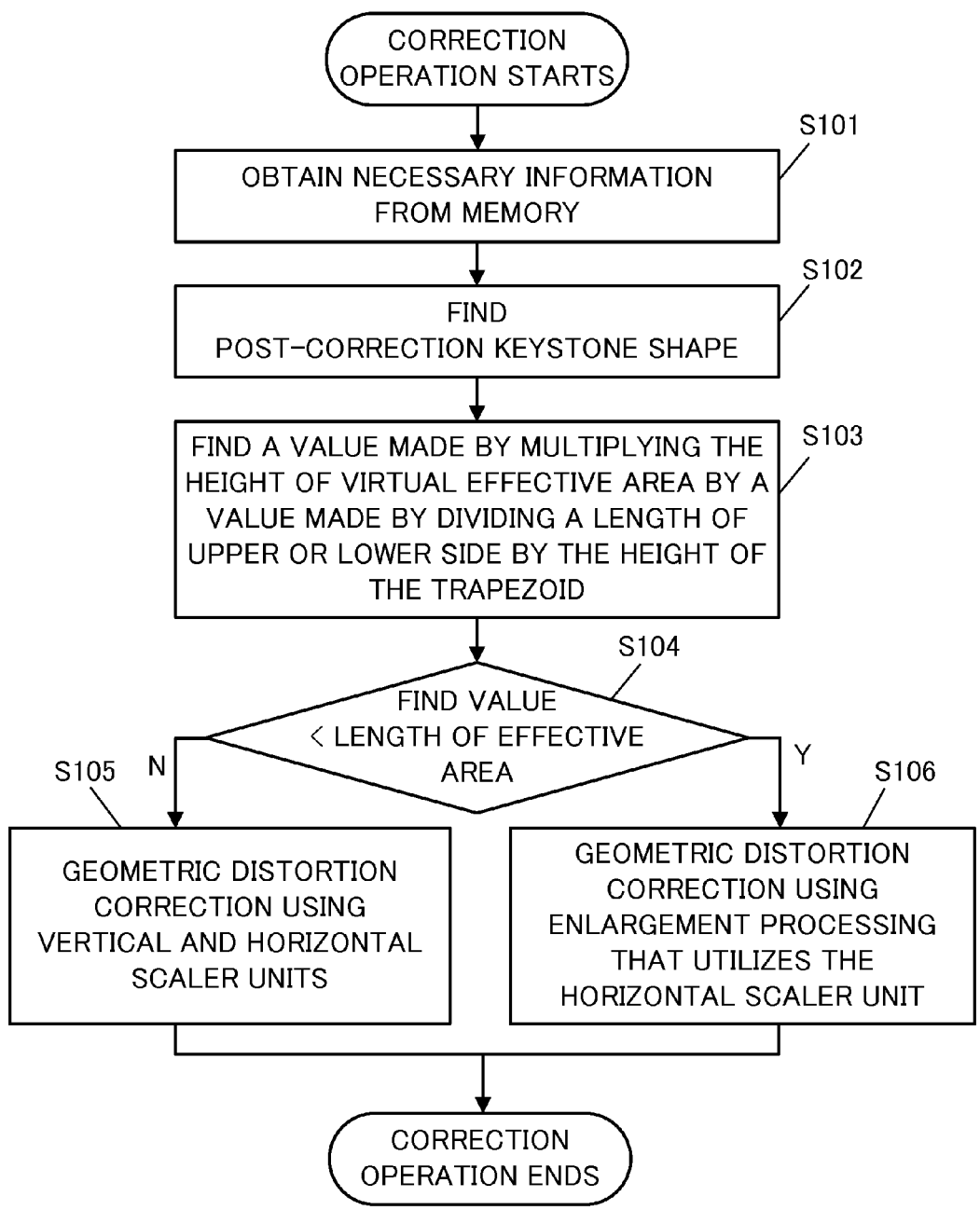
FIG. 2 is a flowchart of processing executed by a geometric distortion correcting amount calculator illustrated in FIG. 1.

FIG. 2 is a flowchart of the geometric distortion correcting method performed by the geometric distortion correcting amount calculator 11, and "S" stands for a step. FIG. 3 is a view for explaining an effect of the geometric distortion correction to an image in which the 4:3 pre-geometric-distortion-correction virtual effective area U (second effective area) is set in and smaller than the 16:9 (first) effective area K of the display unit 7a.

Initially, the geometric distortion correcting amount calculator 11 obtains from the memory 3 the information relating of the effective area K of the display unit 7a, the information relating to the pre-correction virtual effective area U, and the correction parameters, such as an inclination angle of the Keystone distortion (S101).

Next, the geometric distortion correcting amount calculator 11 finds a trapezoidal shape in which the geometric distortion is corrected, based on a variety of information obtained in S101 (S102).

Next, the geometric distortion correcting amount calculator 11 finds a value by dividing a length of a longer one of the upper and lower sides of the trapezoidal shape found in S102 by the height, and a value by multiplying the ratio by the height of the virtual effective area (S103).

Next, the geometric distortion correcting amount calculator 11 determines whether the value found in S103 is equal to or smaller than the horizontal width of the effective area K of the display unit 7a (S104).

When determining that the value found in S103 is equal to or larger than the horizontal width of the effective area K of the display unit 7a (No of S104), the geometric distortion correcting amount calculator 11 corrects the geometric distortion by utilizing the vertical scaler unit 12 and the horizontal scaler unit 13 (S105).

More specifically, the geometric distortion correcting amount calculator 11 calculates a correcting amount of each of the vertical scaler unit 12 and the horizontal scaler unit 13 so that the line (which is a longer one of the upper and lower sides) that maximizes the horizontal enlargement ratio can accord with the width of the effective area, and sets a correcting amount to each scaler unit. For example, if the lower side overflows the effective area K when the height of the trapezoid is accorded with the height of the virtual effective area M, the whole is reduced so that the lower side can accord with the horizontal width of the effective area K. In this case, the height of the post-correction virtual effective area M is smaller than that of the pre-correction virtual effective area U.

On the other hand, when determining that the value found in S103 is smaller than the width of the effective area K (Yes of S104), the geometric distortion correcting amount calculator 11 corrects the geometric distortion through the enlargement processing utilizing the horizontal scaler unit 13 (S106). Here, the correcting amount of the horizontal scaler unit 13 is calculated and the correction by the vertical scaler unit 12 is not performed. In this case, the height of the post-correction virtual effective area M accords with the height of the pre-correction virtual effective area U but the lower side is shorter than the horizontal length of the effective area K (but has a portion located in the area V).

Thus, in the range that can be corrected by the horizontal enlargement processing, the geometric distortion correction processing uses only the enlargement processing, and in other cases, the geometric distortion correction processing utilizes a combination of the vertical reduction processing, the reduction processing in the horizontal line, and the horizontal enlargement/reduction processing. In either case, the post-correction virtual effective area M (third effective area) has a portion located in the area V between the pre-correction virtual effective area U and the effective area K of the display unit 7a.

In installing the projection-type display apparatus, the VEA is determined, the projection-type display apparatus is installed, and an image is projected so that the range of the VEA can be recognized. Next, the attitude of the projection-type display apparatus is adjusted. Next, the geometric distortion correcting amount is set such that the image on the projection surface can be displayed without distortion, and the size and the position of the projected image are adjusted by utilizing the zoom or shift mechanism. When the adjustment is completed, image processing is set, such as an adjustment of the brightness and color. When the adjustment is not completed, the processing is repeated from the adjustment of the attitude of the projection-type display apparatus.

The installed projection-type display apparatus of this embodiment executes geometric distortion corrections having equivalent effects to all inputs. Even when the size of the input image varies, the image is projected with a size equal to or smaller than an image that is displayed on the entire VEA. Therefore, unless the installment location or the projection surface of the projection-type display apparatus varies, the reinstallation is unnecessary.

A hatched area on the right side in FIG. 3 illustrates a VEA when the post-correction virtual effective area M illustrated on the left side in FIG. 3 is projected onto a projection surface (not illustrated), and maintains the aspect ratio of the pre-correction virtual effective area U. A broken line on the right side in FIG. 3 illustrates a projected area when the image is displayed on the entire surface of the effective area K of the display unit 7a.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, this embodiment divides scaling to the input image from scaling performed at the geometric distortion correction time, but a series of processing may be performed together. In addition, this embodiment discusses a correction of a Keystone distortion caused by the inclination in the vertical direction and limits the enlargement processing to the horizontal direction but the Keystone distortion caused by the inclination in the horizontal direction may be correctable and the vertical enlargement processing may be performed.

This application claims the benefit of Japanese Patent Application No. 2009-296580, filed Dec. 28, 2009, which is hereby incorporated by reference herein in its entirety.

What is claimed is:

1. A projection-type display apparatus comprising:
   a display unit having a first effective area, which is the largest usable area for a display; and
   a geometric distortion corrector configured to correct a geometric distortion by performing, for an input image that is superimposed onto an image of a second effective area, which is set in and smaller than the first effective area and is a virtual effective area whose geometric distortion has not yet been corrected, enlargement processing so that a third effective area, which is a post-correction virtual effective area, has a portion located in an area between the first effective area and the second effective area, and the second effective area is enlarged, if the third effective area is entirely contained in the first effective area, and by further performing reduction processing, if the third effective area has a portion that is located outside the first effective area, to reduce the third effective area so that the third effective area is entirely contained in the first effective area.

2. A geometric distortion correcting method comprising the steps of:
   obtaining, with a processor, information relating to a first effective area, which is the largest usable area for a display of a display unit, information relating to a second effective area, which is set in and smaller than the first effective area and is a virtual effective area whose geometric distortion has not yet been corrected, and information used to correct a geometric distortion; and
   correcting, with the processor based on the information obtained by the obtaining step, a geometric distortion by performing, for an input image that is superimposed onto an image of the second effective area, enlargement processing so that a third effective area, which is a post-correction virtual effective area, has a portion located in an area between the first effective area and the second effective area, and the second effective area, which is the post-correction virtual effective area, is enlarged, if the third effective area is entirely contained in the first effective area, and by further performing reduction processing, if the third effective area has a portion that is located outside the first effective area, to reduce the third effective area so that the third effective area is entirely contained in the first effective area.

* * * * *